Dec. 19, 1967  N. M. BASHARA ET AL  3,359,448
LOW WORK FUNCTION THIN FILM GAP EMITTER
Filed Nov. 4, 1964  2 Sheets-Sheet 1
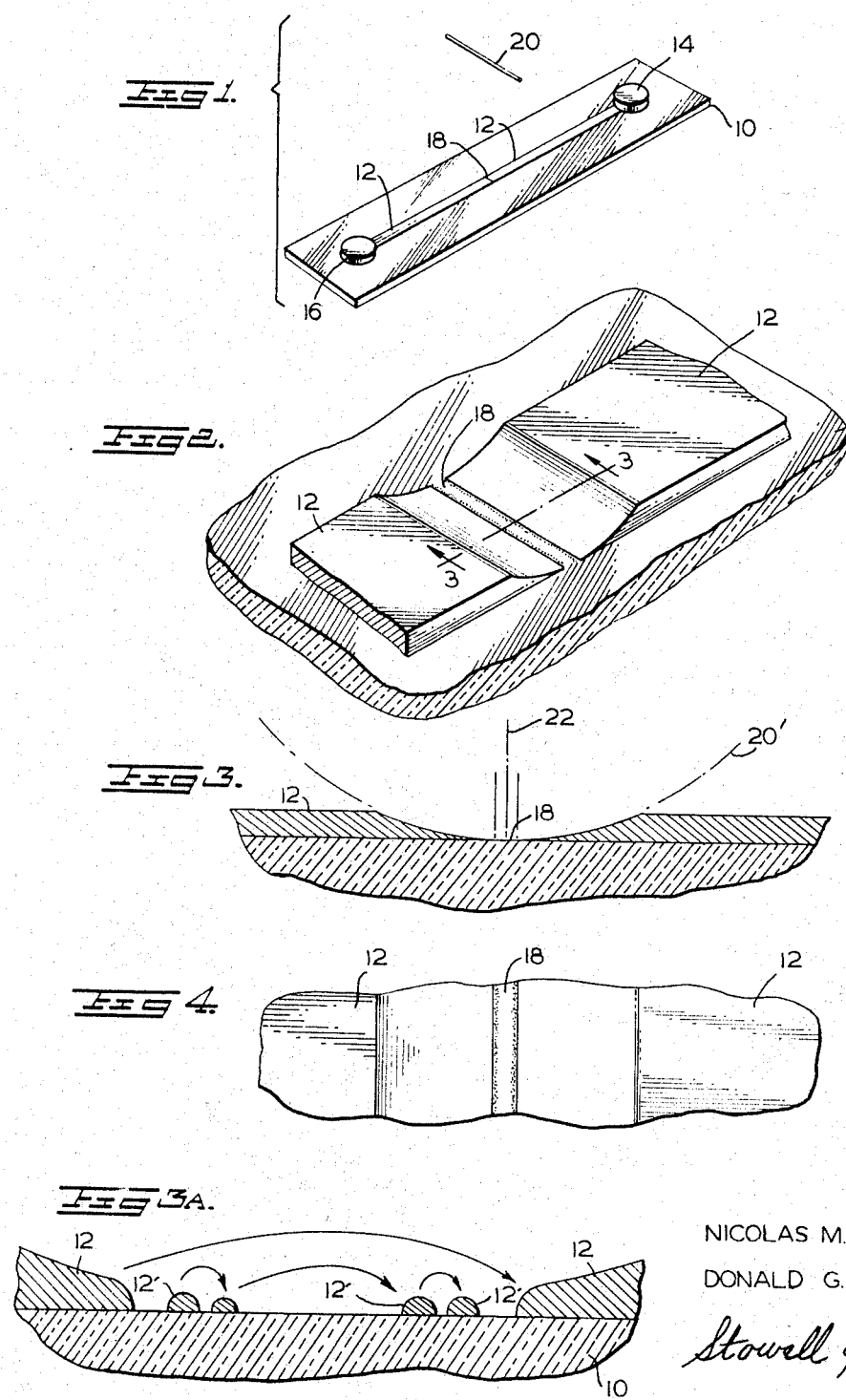
INVENTORS
NICOLAS M. BASHARA
DONALD G. SCHUELER
Stowell & Stowell
ATTORNEYS Dec. 19, 1967  N. M. BASHARA ET AL  3,359,448
LOW WORK FUNCTION THIN FILM GAP EMITTER
Filed Nov. 4, 1964  2 Sheets-Sheet 2
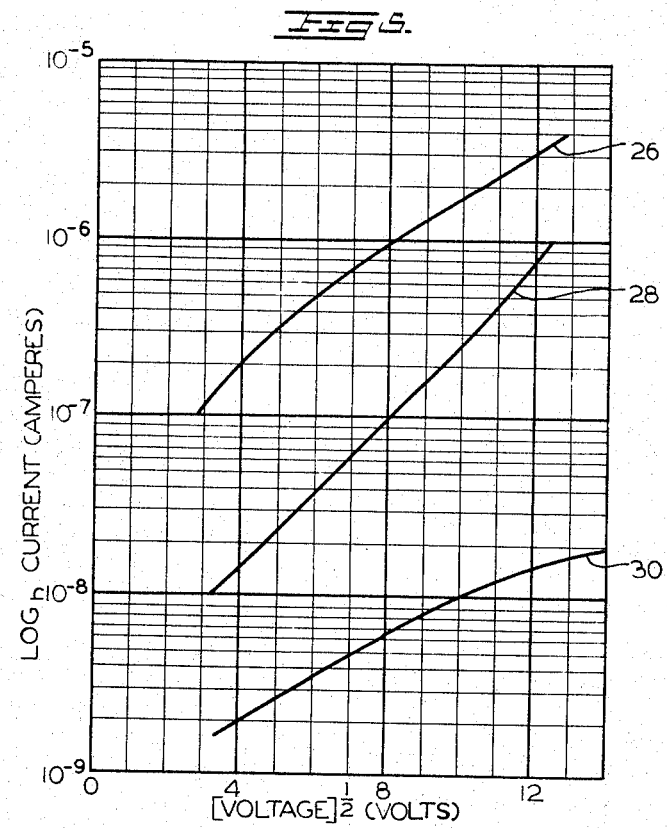
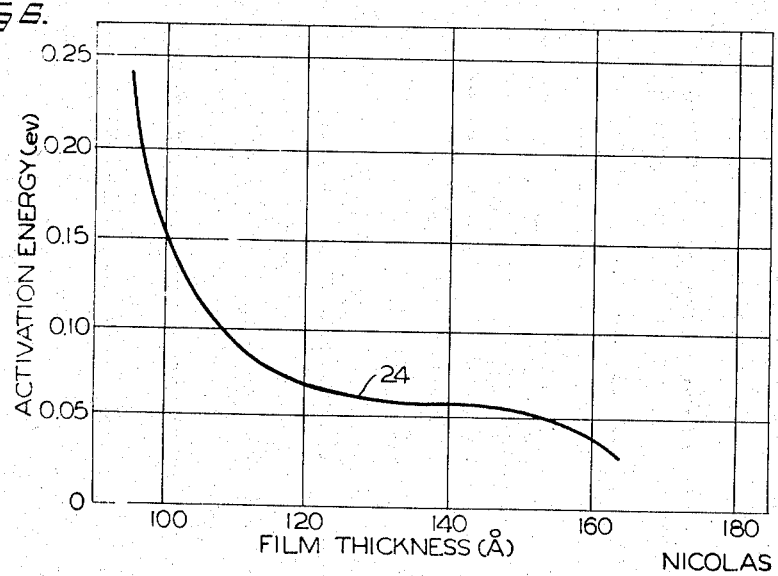
INVENTORS
NICOLAS M. BASHARA
DONALD G. SCHUELER
BY *Stowell & Stowell*
ATTORNEYS

United States Patent Office 3,359,448
Patented Dec. 19, 1967

3,359,448
LOW WORK FUNCTION THIN FILM
GAP EMITTER
Nicolas M. Bashara, Lincoln, Nebr., and Donald G. Schueler, Albuquerque, N. Mex., assignors to Research Corporation, New York, N.Y., a non-profit corporation of New York
Filed Nov. 4, 1964, Ser. No. 408,813
2 Claims. (Cl. 313—326)

The present invention relates to a narrow gap device which acts as a low work function emission source in a vacuum. It is thus a "cold-cathode" type of emission source, and it may be utilized in association with an anode and intervening grid elements if desired.

We have discovered that a very thin film with a narrow gap therein, or in certain cases the film per se, exhibits a Schottky field emission effect. The Schottky effect is defined as being the enhancement of the thermionic emission of electrons into vacuum by a heated conductor resulting from an electric field at the conductor surface. Since the thermionic emission is given by the Richardson formula:

$$J = AT^2 e^{-\left(\frac{\phi}{kT}\right)} \qquad (1)$$

wherein J is the emission current density in amperes per square centimeter; A is a constant; T is the conductor temperature in degrees K.; k is Boltzmann's constant, $1.38(10)^{-23}$ joule/degree C.; e is the electron's charge, $1.6(10)^{-19}$ coulomb; and $\phi$ is the work function of the emitter; an increase in the current at a given temperature implies a desirable reduction in the work function $\phi$ of the emitter.

The work function $\phi$ is thus a quantity with the dimensions of energy which determines the thermionic emission of a solid at a given temperature, and is usually expressed in electron volts. The average value of $\phi$ for the metal gold is 4.89 ev., and 4.54 ev. for tungsten.

Field emission, often called cold emission; the adjective "cold" referring to the fact that it does not require elevated temperatures; differs from thermionic, photo-, and secondary emission in that an in such processes the electrons escape across the surface potential barrier. In field emission the electrons are emitted from the surface of a conductor due to the influence of a strong electric field, and in such emission process the electrons penetrate through the surface potential barrier by virtue of the quantum mechanical tunel effect; this effect is a result of the wave nature of elementary particles.

However, field emission may be enhanced by thermionic heating because the probability for tunneling through the surface potential barrier increases with increasing energy of the electrons. Therefore the thin film emission effect of the present invention has utility in both cold and thermionic emission; wherever a low work function is desirable.

The Schottky field enhanced emission equation applies to a wide variety of structures, and has the following form:

$$I = AST^2 \exp\{1/kT[(ev/4\pi\epsilon_0\epsilon_r d)^{1/2} - \phi]\} \text{amperes} \qquad (2)$$

where S is the area in square meters; d is the anode-cathode separation distance in meters; $\epsilon_0$ is the permittivity constant of empty space, $8.85(10)^{-12}$ coul.$^2$/newton-meter squared; v is the applied voltage; $\epsilon_r$ is the relative dielectric constant; A is Richardson's constant as given in Equation 1; and the remaining quantities are as defined for Equation 1.

It will be observed that the thermionic emission defined by Equation 1 has been enhanced with the field present as represented in Equation 2. Such enhancement is realized because the applied field has reduced the work function of the emitter by a factor $\Delta\phi$, and thus the work function $\phi$ in the Richardson formula should be replaced by $(\phi - \Delta\phi)$. Hence, the current increases due the Schottky field effect by a factor which is given by the exponential of Equation 2.

According to this interpretation of the Schottky relationship a plot of the logarithm of the current I versus the square root of the applied voltage V should yield a straight line; the so-called Schottky line. There is a deviation from the straight line for low applied voltages due to space-charge effects, but it is possible to obtain the true saturation current for zero field conditions by extrapolation of the straight portion of the line to the current intercept at zero voltage.

With the foregoing known principles of emission sources in mind, and considering the desirability of reducing the work function, we have developed a narrow gap cold emission device wherein the gap width or thickness measurement is in good agreement with calculated values obtained from the Schottky relations which exhibits advantageous and unusually low values of work function; such values being lower than the value for the metal in which the gap is formed.

Accordingly, it is an object of the present invention to produce a low work function emitter.

More particularly, it is an object of the present invention to produce a low work function cold emission device which utilizes a narrow gap in a thin metallic film; which device exhibits an effective work function which is less than that of the bulk metal.

The above and further objects and advantages of the present invention will become apparent from the detailed description thereof which follows, when taken together with the accompanying drawings, wherein:

FIG. 1 is an exploded perspective view showing a preferred manner of fabrication of a narrow gap emission device;

FIG. 2 is a fragmentary perspective view, to a greatly enlarged scale, which illustrates certain details of the gap emission area;

FIG. 3 is a fragmentary sectional view of the gap emission area shown in FIG. 2, taken along the line 3—3;

FIG. 3A is a fragmentary sectional view of a portion of FIG. 3 to an enlarged scale;

FIG. 4 is a fragmentary plan view of the gap emission area shown in FIG. 3; and

FIGS. 5 and 6 are characteristic curves useful in understanding the operation of the narrow gap emission device.

As illustrated in FIG. 1, a suitable substrate 10 having the desired dielectric properties; for example, glass; is masked in such a manner that a thin film of metal may be vacuum vapor deposited thereon in the general shape of a ribbon 12 by means well known in the art.

Terminals 14 and 16 are provided at the ends of ribbon 12 so that electrical connections may be made to the emission device. A gap 18 of novel design is formed in the ribbon during the vapor coating of the substrate.

Gap 18 is formed by means of a cylindrical masking element 20 which is held transversely of, and in contact with, the upper surface of the substrate 10 during the coating.

Gold, tungsten, or any other metal which can be vacuum vapor deposited onto the substrate may be used to form the ribbon 12, and the same or other conductive metal may be used for the terminals 14 and 16. As shown in FIG. 1, these terminals have a greater surface area and are thicker than the ribbon 12 in order to provide low resistance connection points to the device.

*Example*

Using the technique as previously described, a glass slide was prepared upon which gold was vapor coated in a ribbon having a width of one-sixteenth of an inch, to a thickness or depth of substantially 500 A. Prior to the coating step a cylindrical mask consisting of a glass fiber was stretched transversely across the width of the slide. The glass fibers used ranged from about 0.0004 to 0.0005 inch in diameter, and were thus slightly larger than 100,000 A. in diameter. The resultant thin film structure having a gap transverse to the ribbon length was operated in a vacuum of substantially $2(10)^{-6}$ torr.

When it is considered that the one-sixteenth of an inch ribbon width calculates to approximately $16(10)^6$ A., it will be obvious that the accompanying drawing FIGS. 1–4 are not to scale.

Tests of gap structures fabricated as outlined in the example above are discussed hereinafter. Such test results confirm the surprisingly low value for the work function $\phi$ for gold film ribbon structures masked with glass fibers of varying diameters.

FIG. 2 illustrates certain details of the emission area of gap 18. It is considered that the nature of the vapor coated surface underneath the glass fiber mask, i.e., the emission area of gap 18, has an important bearing on the low value of work function which has been achieved.

Because of the circular structure of the mask cross-section element 20, the amount of metal deposited will become less toward the center of gap 18 under the fiber mask. It is well known that vacuum evaporated metals will become discontinuous as they become thinner. Because of the mask used the metal would be expected to become thinner toward the center under the glass fiber.

As shown in FIG. 3, wherein the position of the masking fiber 20 has been shown in phantom by the dashed line 20', the deposited metal of ribbon 12 becomes thinner in the gap area as one approaches the vertical center-line 22 of the masking fiber. At either edge of the gap 18 the deposited film becomes discontinuous, as noted above, resulting in a plurality of isolated metallic islands on either side of the main gap. Such islands are generally indicated by the reference numeral 12'; FIG. 3A.

It can be shown that the activation energy to move an electron from one island to another in a discontinuous metal structure is related to the thickness. A determination of this activation energy in the thickness range of 50 to 200 A. reveals that it lies within an order of magnitude of the measured work function of the gold films masked with glass fibers made as outlined in the above example. It is considered that there is a correlation between the low work function of the emission device of the invention and this activation energy, since thicknesses of 50 to 200 A. would be expected in the discontinuous island structures in the boundaries of the gap region, due to the cylindrical mask. The realization of such thicknesses will be apparent when it is considered that a masking fiber 20 of 100,000 A. diameter is thus two hundred times the dimension of the deposited ribbon 12, and that such ribbon will taper and thin down underneath the cylindrical mask.

An estimate of the activation energy to move an electron from one island to another can be obtained in the following way. The energy required to remove an electron to a distance $d$, from a metal island of radius $r$ is $$W = e^2/4\pi\epsilon_0 r - e^2/4\pi\epsilon_0 (d+r) \quad (3)$$

Note that the energy to move an electron to $d$ is less than that required for removal to infinity. The energy needed can be reduced further by application of an electric field to attract the electron. The total energy under these conditions becomes, $$W = e^2/4\pi\epsilon_0 r - e^2/4\pi\epsilon_0(d+r) - deE \quad (4)$$

where $E$ is field at $d$.

Equation 4 has a maximum value which can be obtained as follows: When the derivative of Equation 4 is set equal to zero, a solution can be obtained for the distance from the island corresponding to maximum energy. Substituting this value of $d$ gives the following expression for maximum energy:

$$W_{max.} = e^2/4\pi\epsilon_0 r - 2(e^3E/4\pi\epsilon_0)^{1/2} + reE \quad (5)$$

The density of electrons corresponding to maximum energy would be given by the usual Boltzmann expression if the density of islands is given by N, $$n = N \exp(-W_{max.}/kT) \quad (6)$$

Substituting for $W_{max.}$ from Equation 5 gives, $$n = N \exp[-e^2/4\pi\epsilon_0 r + 2(e^3E/4\pi\epsilon_0)^{1/2} - reE]/kT \quad (7)$$

The isothermal electrical conductivity $\sigma$ is proportional to $n$, $$\sigma = Ln, \text{ mhos/meter} \quad (8)$$

where $L$ is a constant.

Substituting for $n$ from Equation 7

$$\sigma = LN \exp[-e^2/4\pi\epsilon_0 r + 2(e^3E/4\pi\epsilon_0)^{1/2} - reE]/kT \quad (9)$$

Pertinent to the immediate problem is the low field, or so-called zero field, conductivity which is readily observed experimentally in a plot of conductivity vs. applied field to the one-half power. In the thickness range of interest the conductivity is found to be constant at constant temperature at low fields if no macroscopic discontinuities are present in the gap.

An expression may be obtained which predicts that the conductivity is independent of the field at low applied fields. This is in contrast to an observed increase in conductivity at higher fields. Furthermore, $$\log_n \sigma_0 = \text{constant} - W_a/kT \quad (10)$$

where $W_a$ is the activation energy, and $\sigma_0$ is the zero field conductivity.

Equation 10 can be used to obtain the activation energy by plotting $\log_n \sigma_0$ as a function of reciprocal temperature. This was done experimentally on gold films in the thickness range of interest. The results are shown in FIG. 6 by the curve 24. Note that the activation energy is about 0.05 ev. for the 150 A. film and 0.15 for 95 A.

Also, since the conductivity is relatively constant at low field Equation 9 can be used to estimate the particle size of the islands since Equation 9 reduces to the following:

$$\log_n \sigma_0 = \log_n(LN) - (e^2/4\pi\epsilon_0 rkT) \quad (11)$$

Therefore, a plot of $\log_n \sigma_0$ vs. $1/T$ makes possible a solution of the average particle size at least in theory, since $\log_n \sigma_0$ vs. $1/T$ is a reasonably straight line over a wide temperature range. The choice of temperature point is not critical, and room temperature may be used. The average particle sizes obtained appeared to be reasonable.

A mechanism which served to create a positive space charge at the cathode would provide at least qualitatively the basis for a lowering of the work function. The island structure 12' on either side of the gap 18 provides the mechanism, since with the activation of the electrons from the islands at the cathode, the activated islands become positively charged. See FIG. 3A.

It is concluded that the unexpected low work function arises from the island structure on either side of the gap. The activation energy from island to island is dependent on separation distance (thickness). The activation of islands creates positive ions at the cathode, which in turn leads to a lowering of the work function as compared to the bulk value.

The results of tests conducted upon gap emission devices constructed in accordance with the example previously described provided additional confirmation of the unusually low values of work function obtained from the thin film structures.

The Schottky emission relation given by Equation 2 if rigorously applied would take into account observed deviations in the quantity A, and also the temperature dependence of approximately $(10)^{-4}$ ev./degree of the work function of the metal. However, changes of these same factors may be neglected, to a first approximation. FIG. 5 shows curves 26, 28, and 30 which are current-voltage plots of narrow thin film gaps prepared by use of the glass fiber mask technique.

The plot of $\log_n I$ vs. $V^{1/2}$ should exhibit a straight line; the so-called Schottky line. From its slope, $n$, one can obtain the effective gap width measurement, $$d = [e/4\pi\epsilon_0\epsilon_r(kT)^2 n^2], \text{ meters} \quad (12)$$

Also, if one extrapolates to the current intercept at zero voltage $I_o$, one can solve for the work function, $$\phi = kT \log_n(AST^2/I_o), \text{ electron volts} \quad (13)$$

Alternatively, a plot of $\log_n I$ vs. $1/T$ at constant known voltage and separation distance makes possible a calculation of the work function.

Using Equations 12 and 13 the following results were obtained for three different gap structures:

| Gap | Calculated Width, A. | Calculated Work Function, ev. |
|---|---|---|
| S-11 | 86,800 | 0.567 |
| S-12 | 207,000 | 0.483 |
| S-14 | 83,500 | 0.593 |

Modifications of the invention may be made, as will be apparent to those skilled in the art, and it is not intended to be limited to any particular theory of operation of the gap structure, nor to a particular range of sizes for the gap per se or to the discrete, agglomerate isolated island elements adjacent the edge boundaries thereof, except as defined in the appended claims.

Thus, it should be noted that while the described manner of forming the emitter gap area by means of a cylindrical fiber glass masking member which results in the gap thickness becoming smaller toward the gap center is the preferred embodiment of the invention, the gap may also be formed in any equivalent manner. For example, a gap which behaved in a similar manner was formed by bridging a gap between two vacuum evaporated electrodes with a very thin evaporated layer of metal, and then applying a voltage sufficient to open a fissure in the thin layer. The generalized conclusion is that the low work function emission effect would be observed whenever the edge of the gap is made up of an agglomerate structure of discrete island elements.

What is claimed is:
1. A low work function emission source comprising a very thin metallic film; a narrow dielectric gap formed in said film, traversing the same and separating the film into two electrically insulated spaced portions; the separation between said portions being of the order of 100,000 angstroms and a plurality of discrete, metallic island elements positioned adjacent the spaced film portions and between the boundaries of said gap.

2. A low work function emission source as in claim 1 wherein said island elements are of lesser thickness than said thin metallic film.

References Cited
UNITED STATES PATENTS

| | | | |
|---|---|---|---|
| 3,056,073 | 9/1962 | Mead | 317—234 |
| 3,116,427 | 12/1963 | Giaever | 307—88.5 |
| 3,204,159 | 8/1965 | Bramley | 317—235 |
| 3,277,313 | 10/1966 | Unterkofler | 307—88.5 |

JOHN W. HUCKERT, *Primary Examiner.*

M. EDLOW, *Assistant Examiner.*